UNITED STATES PATENT OFFICE.

JOHN B. ROWELL, OF LYNN, MASSACHUSETTS, ASSIGNOR TO JONATHAN BUFFUM, OF SAME PLACE.

COMPOSITION FOR COVERING BLACKBOARDS.

Specification forming part of Letters Patent No. 29,552, dated August 7, 1860.

*To all whom it may concern:*

Be it known that I, JOHN B. ROWELL, of Lynn, in the county of Essex and State of Massachusetts, have invented a new and useful composition of matter designed for a covering upon such surfaces as are to be used and marked upon, as slates and "blackboards;" and I do hereby declare that the following is a full and exact description of the said composition and of the mode of applying it, sufficiently clear and exact to enable those skilled in the art to practice my invention.

The object of my invention is to produce a composition which will adhere to such surfaces as paint or varnish will cling to, which can be applied with a brush in the same manner with paint, and which, when so applied, will present a surface which is well adapted for writing and marking upon with "slate-pencils," crayons, chalk, &c., and from which such marking can be erased by dry rubbing, and which can be cleansed by use of water without softening or otherwise injuring it, the composition being designed as a superior substitute for the surface of the common blackboard, at about the same cost, and as an equivalent for slate at a much less cost, and with the advantage of much less weight, as the body to which the composition is applied may be of wood, papier-maché, &c.

The composition is a compound of alcohol and shellac, linseed or other equivalent oil, lamp-black or other coloring-matter, flour of emery, and black oxide of manganese, or sulphate of zinc, or other equivalent oil-drier.

I use the ingredients in the following manner and proportions. I make the alcohol and shellac into nearly a saturated solution, or considerably thicker than shellac-alcohol varnish is mixed for common use. For about one gallon of alcohol and two and one-half pounds of shellac I mix therewith about three pounds of flour of emery. For the above quantity I take about a gill of raw linseed-oil and mix in it about an ounce of lamp-black, so that this mixture is of about the consistency of common paint. This mixture is added to that of the shellac-varnish and emery. The purpose of the oil is to keep the composition from setting or drying so soon after being spread as to render it difficult to cover a surface evenly. The amount of oil required varies somewhat with circumstances—such as the thickness of the varnish and the drying influence of the atmosphere at the time when the composition is used, more oil being needed to prevent too quick set upon some days than on others. To the whole mixture I add from one-half ounce to one ounce of the black oxide of manganese, or of the sulphate of zinc, in the form of a fine powder, to operate as a drier for the oil.

The mixture or composition is to be kept well stirred and applied in the manner of paint. Its application upon absorbing surfaces is facilitated by first preparing them by common shellac varnish. After the composition has been applied it should be washed over with cold water and a sponge, which renders the composition harder than it would be without such washing. Hardness of surface is a desideratum where it is to be marked upon. The hardness of the composition, which is one of its distinguishing characteristics, is due to the shellac. Its water-proof qualities are also due to the shellac, the quantity of oil used being too small to have any other than a slight incidental effect in repelling moisture.

The flour of emery, which is firmly held by the shellac, forms the surface upon which marks are made, its fine and lasting grit being better adapted to take the particles from the marker and to resist wear than any other material of the same cost.

The composition may be applied in one or more coats, and upon the plastering of schoolrooms, old or worn wooden blackboards, or upon pasteboard, &c., to suit the varied requirements for blackboards used for educational and other purposes.

Having described my invention, what I claim as new, and desire to secure by Letters Patent of the United States, is—

The combination of the hereinbefore mentioned ingredients for the purpose set forth, substantially in the proportions described.

Signed this 18th day of June, A. D, 1860.

J. B. ROWELL.

In presence of—
J. B. CROSBY,
GORDON McKAY.